United States Patent
Brandl et al.

(10) Patent No.: US 7,810,389 B2
(45) Date of Patent: Oct. 12, 2010

(54) METHOD FOR DETERMINING A TIRE POSITION IN A TIRE PRESSURE MEASUREMENT SYSTEM

(75) Inventors: Manfred Brandl, Gratwein (AT); Bernd Gessner, Lieboch (AT); Teijo Viljanen, Espoo (FI)

(73) Assignee: Austriamicrosystems AG, Unterpremstaetten (AT)

( * ) Notice: Subject to any disclaimer, the term of this patent is extended or adjusted under 35 U.S.C. 154(b) by 688 days.

(21) Appl. No.: 11/740,149

(22) Filed: Apr. 25, 2007

(65) Prior Publication Data

US 2008/0319701 A1    Dec. 25, 2008

(30) Foreign Application Priority Data

Apr. 26, 2006   (EP)   ................... 06008672

(51) Int. Cl.
B60C 23/02 (2006.01)
(52) U.S. Cl. ................................... 73/146.5
(58) Field of Classification Search ........................ None
See application file for complete search history.

(56) References Cited

U.S. PATENT DOCUMENTS 6,445,286 B1    9/2002  Kessler et al.
7,559,235 B2 *  7/2009  Maekawa ..................... 73/146
2002/0044050 A1 4/2002  Derbyshire et al.
2006/0055524 A1* 3/2006  Okubo ........................ 340/445

FOREIGN PATENT DOCUMENTS

EP    1 516 753 A1     3/2005
WO    WO 2004/037566 A1  5/2004

\* cited by examiner

*Primary Examiner*—Andre J Allen
(74) *Attorney, Agent, or Firm*—Fish & Richardson P.C.

(57) ABSTRACT

In a method for transmitting data, the step of transmitting the data representing a measured pressure or pressure variation is repeated with a first repetition rate if no pressure variation has been detected or repeated with a second repetition rate if a specific pressure variation has been detected. The second repetition rate is higher than the first repetition rate. The different repetition frequencies can be used in a method for determining a tire position in a tire pressure measurement system to switch between a first mode of operation and a second mode of operation. The method for determining a tire position evaluates the repetition rate between the received data packets of transmitted data and extracts a pressure variation out of the received data packets.

14 Claims, 6 Drawing Sheets

METHOD FOR DETERMINING A TIRE POSITION IN A TIRE PRESSURE MEASUREMENT SYSTEM

CROSS-REFERENCE TO RELATED APPLICATION

This patent application claims priority to European Patent Application No. 06008672.5 (filed on Apr. 26, 2006). The contents of European Patent Application No. 06008672.5 are hereby incorporated by reference into this application as if set forth herein in full.

TECHNICAL FIELD

The present disclosure relates to a method for transmitting data, particularly in a tire pressure measurement system and to a method for determining a tire position in a tire pressure measurement system. The disclosure also relates to a pressure sensing unit.

BACKGROUND

Modem vehicular and automotive systems are increasingly using sensors to determine whether there is adequate air pressure in tires. In such systems a pressure sensor unit is arranged on the tire to monitor the tire pressure and detect a sudden pressure drop. The measured pressure or measures pressure variation is then transmitted to a control circuitry within the vehicle using a radio frequency data link.

Conventional systems normally use a battery power source with a life requirement of many years. Power from the battery is consumed during pressure and temperature measurements, RF communication and from the overall standby time. To increase the battery's lifespan various power management concepts are known to minimize consumption. Some of them are based on detection of vehicle motion.

When tires are changed, the unit of the pressure measurement system within the vehicle has to identify the new pressure sensors and allocate specified tire position to the newly identified sensor. Such identification often uses a bidirectional communication, where the control circuit within the vehicle sends an identification request to the pressure sensors within the tires. The pressure sensors identify themselves in response to the received request. Such bidirectional communication can also be used to set how frequently the pressure measurement is transmitted in case of a close surveillance of the tire pressure. However, a bidirectional communication requires one or several transmitters in the car chassis as well as a receiver for each sensing unit. This is a significant cost factor and consumes additional power for transmitter and receiver.

It is desirable to provide a method for demand driven pressure transmission over a unidirectional transmission link. There is also a need to provide a method for determining a tire position without the requirement of an additional receiver in the pressure sensing unit.

SUMMARY

These objectives are solved by the subject matter of the independent claims. Further embodiments are subject matter of the dependent claims.

According to the disclosure, power consumption can be significantly reduced, if "intelligence" regarding the pressure measurement is incorporated into the pressure sensing unit. One aspect is to significantly reduce repetition rate of pressure sending and transmission respectively, if a pressure variation within a specific time period is not detected. In a further aspect, the repetition rate of data transmission is be evaluated to switch to a special mode of operation.

The method for transmitting data may comprise: measuring the pressure, detecting a pressure variation with respect to a previous measurement, transmitting data representing the measured pressure or the pressure variation, and repeating at least the step of transmitting data with a first repetition rate, if no pressure variation has been detected or repeating at least the step of transmitting data with a second repetition rate, if a specific pressure variation has been detected or exceeded, wherein the second repetition rate is higher than the first repetition rate.

According to an embodiment, it is decided by the pressure variation or the pressure measurement alone whether the data representing the measured pressure or the pressure variation shall be transmitted with a high repetition rate or with a low repetition rate. Therefore a bidirectional communication is not necessary. If a pressure variation occurs within the tire, data is transmitted with a high repetition rate. The low sending rate of data on the other hand results in significantly reduced power consumption.

In one aspect, during low repetition the pressure data might be transmitted once per minute, or even less often. During high repetition, the data may be transmitted once per second, for example. A sensing unit using the proposed method requires only a transmitter for a unidirectional data link. Since a control circuit receiving the transmitting data does not communicate to the sensing unit, a receiver for the sensing unit is not required, thereby reducing the costs of the sensing unit.

The pressure variation can be detected by comparing a value representing the measured pressure with at least one threshold value. Alternatively a value representing the measured pressure can be subtracted from a value representing a previous pressure measurement. The results can be compared with a second threshold value, called a delta threshold value. Such comparison can also be used to detect a pressure increase instead of a pressure decrease. In addition, it is also possible to obtain a temperature and derive the pressure variation from the temperature value. Measuring the pressure in dependence of the temperature is useful to compensate pressure variation effects related to temperature variation.

The method for transmitting data provides a temporary operating mode for pressure measurement and sending data with a higher repetition rate than the normal operating mode. In the temporary operating mode the time intervals for transmitting temperature, pressure and unit identification information is shortened. According to the present invention, the operating mode can be entered by changing the pressure rapidly. This temporary mode can be used for determining a tire position in a tire measurement system.

According to the disclosure, such a method comprises: receiving data packets comprising measurement data, said data packets transmitted by a pressure sensor mounted on a tire, evaluating a repetition rate between the received data packets, extracting a pressure variation out of the received data packets, switching to a first mode of operation if the pressure variation indicates a pressure drop and the repetition rate exceeds a threshold value, switching to a second mode of operation if the pressure variation indicates a pressure increase.

The second mode of operation, also considered as a temporary learning mode also comprises waiting for tire location information, that information determining the tire position on a vehicle.

Using the present method, a bidirectional communication between a control circuit and a sensing unit is not needed. More particularly, a first mode of operation is entered if a pressure drop is detected by the sensing unit and the repetition rate of the received data packets is set to a high value. If, on the contrary, a pressure increase is indicated while the repetition rate exceeds a threshold value, a learning mode is entered, wherein the tire location information can be entered.

In a further aspect, a pressure sensing unit comprises pressure sensing means for providing a first digital signal derived by pressure. Switching means are coupled with their input terminal to the sensing pressure means. They are adapted for providing a selection signal derived by a comparison of a digital value with a first threshold value, the digital value derived by the first digital signal at the input terminal. Further, the sensing unit comprises transmission means coupled to the switching means. The transmission means are adapted for transmitting a signal comprising data representing a pressure or a pressure variation with a first or a second repetition rate depending on the selection signal.

In the sensing unit according to an embodiment, a receiver for a bidirectional communication is not required. The transmission rate is derived by the value of the measured pressure or the variation of the pressure alone. The transmission means can be deactivated between two subsequent transmissions to further reduce power consumption.

In a further aspect, the switching means comprise a register for storing a second digital signal at the input terminal and adapted for deriving a pressure variation in dependence of the first and second digital signals. The switching means may also comprise a subtraction unit, adapted with a first input to the input terminal and coupled with its second input to an output of the register. In this embodiment the sensing unit can easily derive a pressure variation using two measured pressure values.

In still another aspect, the period for the transmission means to transmit data with the high repetition rate can be selected. In one embodiment, a counter is coupled to the register, while the register is adapted for storing the second digital signal at the input terminal in dependence of an output signal of the counter or adapted for outputting the stored second digital signal in dependence of an output signal of the counter. The counter may be adjustable.

In another aspect, the switching means comprise a first comparator, preferably a window comparator, the comparator adapted for comparing the first digital signal with the first threshold value or the thresholds values respectively, and a second comparator adapted for comparing a second threshold value with a value representing a pressure variation and derived from the first digital signal. This allows detecting a pressure drop as well as a pressure increase.

The pressure sensing means may comprise an oscillator with a variable resonance frequency. The oscillator can be coupled selectively via a switch to a reference capacitor or to a pressure capacitor. A first counter is coupled to the oscillator for counting clock pulses of the oscillator's output signal.

In a further aspect, the pressure sensing means can comprise a second counter with a selectable count direction. An input is coupled to a system clock for counting clock pulses. Furthermore the second counter is coupled to an overflow output of the first counter for selecting the count direction. An output of the second counter might be coupled to the oscillator for deactivating the oscillator.

DESCRIPTION OF DRAWINGS

The details of one or more embodiments of the invention are set forth in the accompanying drawings and the description below. Other features, objects, and advantages will be apparent from the description and drawings, and from the claims.

DETAILED DESCRIPTION

Figure 1:
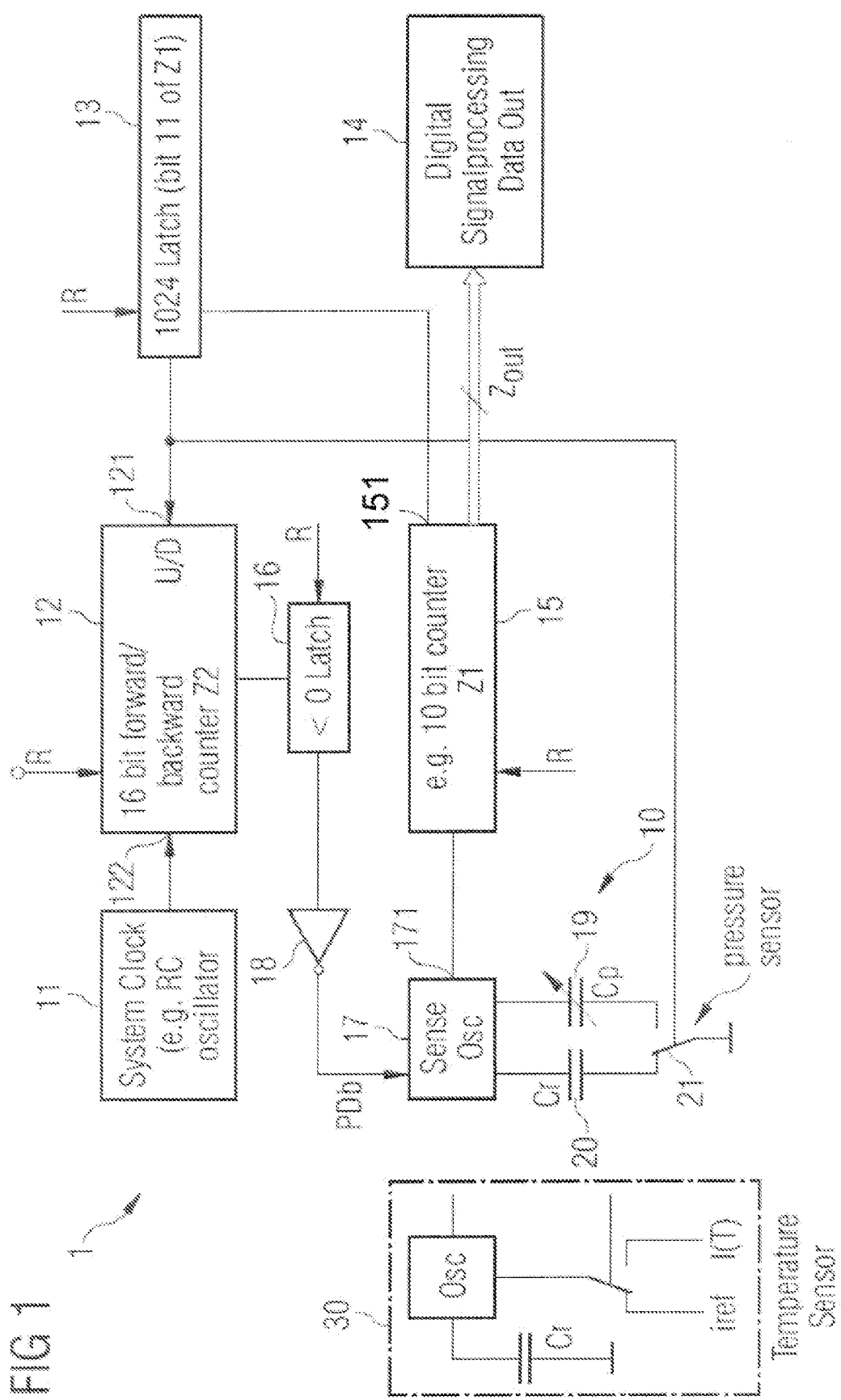
FIG. 1 shows an embodiment of the pressure sensing unit.

FIG. 1 shows an embodiment of a part of the pressure sensing unit, particularly the pressure sensor including circuitry for the pressure measurement.

One aspect relates to the fact that a complex circuitry results in higher power consumption and reduces the lifetime of the included battery. In this embodiment, the pressure sensor 10 comprises a sensing oscillator 17, which is coupled to a reference capacitor 20 with a fixed capacitance Cr and to the capacitor 19 with a variable capacitance Cp. The capacitance Cp of the capacitor 19 is dependent from the air pressure within the tire. The reference capacitor 20 as well the pressure capacitor 19 can be selectively connected to the sensing oscillator 17 by a switching unit 21. Accordingly, the resonance frequency of the sensing oscillator 17 changes in dependence of the connected capacitor. The output terminal 171 of the sensing oscillator 17 is connected to a first counter 15 of a first bit length. The counter 15 also comprises a reset input terminal for resetting the counter. At the end of each conversion cycle, the output signal $Z_{out}$ of the counter 15 represents a measured pressure value. The output signal $Z_{out}$ is further calibrated, linearized and processed in the unit 14.

The counter 15 comprises for example a length of 10 bits, which represents the values from 0 to 1023. An overflow output 151 provides an overflow signal. It is connected to a latch unit 13, which comprises also a reset input for the reset signal R. The output of the latch unit 13 is coupled to control input 121 of a second counter 12. The output is further connected to the switching unit 21 for coupling one of the capacitors 20 or 19 with the sensing oscillator for changing its resonance frequency.

The counter 12 comprises a length of bits, greater than the length of the first counter, for example 16 bits. The counter 12 is adapted for counting in different directions, basically upwards and downwards respectively in dependence on the control signal at the control input 121. It also comprises a clock input and a reset input for the reset signal R. Its clock input 122 is connected to a system clock 11. The output of the counter 12 is coupled to a second latch 16. The latch 16 determines whether the output of the clock 12 is below zero and outputs a control signal to switch the sensing oscillator 17 via an inverter 18 offline.

Figure 2:
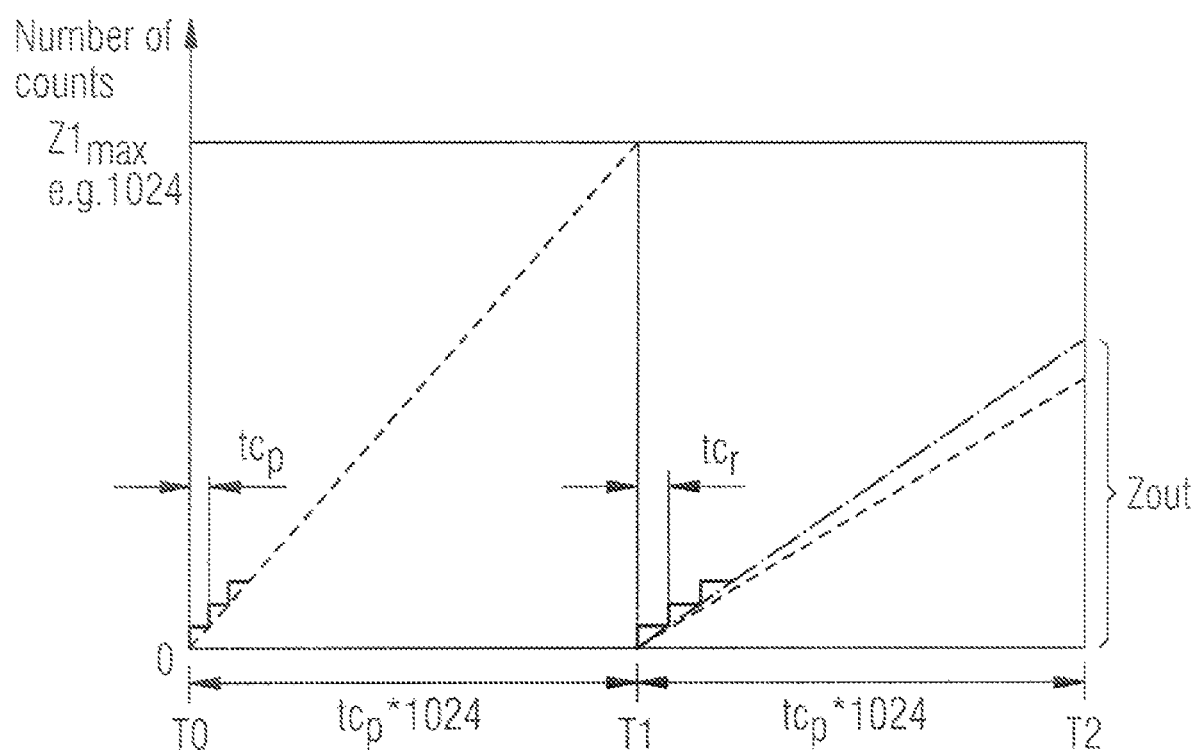
FIG. 2 shows a time/count diagram to explain the operation of the sensing unit according to FIG. 1.

For measuring the pressure, the two counters 12 and 15 as well as the latches 13 and 16 are reset by the reset signal R. The sensing oscillator 17 is coupled to the variable sensing capacitor 19, thereby switching to a first resonance frequency. During measurement, the first counter 15 will count the clock pulses of the output signal of the sensing oscillator. This procedure is shown in FIG. 2. Starting at time T0, the counter 15 counts the clock pulses of the output signal of the sensing oscillator until the counter 15 overflows. In this particular embodiment, an overflow occurs after 1024 periods.

During this time, the second counter 12 counts the clock pulses of the system clock 11. At the time T1 in FIG. 2, the 10 bit counter 15 reaches its maximum value 1024 and outputs an overflow signal at the output 151. The overflow signal is received by the latch unit 13. The latch 13 outputs a control signal to couple the substantially fixed reference capacitor 20 to the sensing oscillator 17 in order to switch the resonance frequency of the unit 17. The signal also indicates a change in the count direction for the counter 12.

The counter 12 counts backward with each pulse of the system clock at its input 122. During this time, the counter 15 counts the clock pulses of the oscillator 17 with its lower resonance frequency. As soon as the output value of counter 12 drops below zero, the latch 16 outputs the control signal PDb to switch off the oscillator 17, thereby stopping measurement. It is assumed that the output signal clock 11 does not substantially change during the measurement.

As it can be seen from FIG. 2, the time from T0 to T1 as well from T1 to T2 is substantially equal. The result Zout of counter 15 is output for further signal processing. Due to this measurement, the output is independent of the system clock 11 and a slow drift of the clock signal of the sensing oscillator 17. Long term effects like aging of resistors for example do not affect the measurement. The output value Zout is given by $$Z_{out} = Z1_{max} * t_{Cp}/t_{Cr}, \text{ for } t_{Cr} > t_{Cp}$$

wherein $Z1_{max}$ is the maximum value of counter 15 and $t_{CR/Cp}$ the respective oscillator time periods. Due to the fact that the pressure within the tire is a function of the time $t_{Cp}$, one can derive the pressure or more easily the pressure variation directly by subtracting the linearized and calibrated output values Zout1, Zout2:

$$\Delta pressure = Zout2 - Zout1$$

Figure 3:
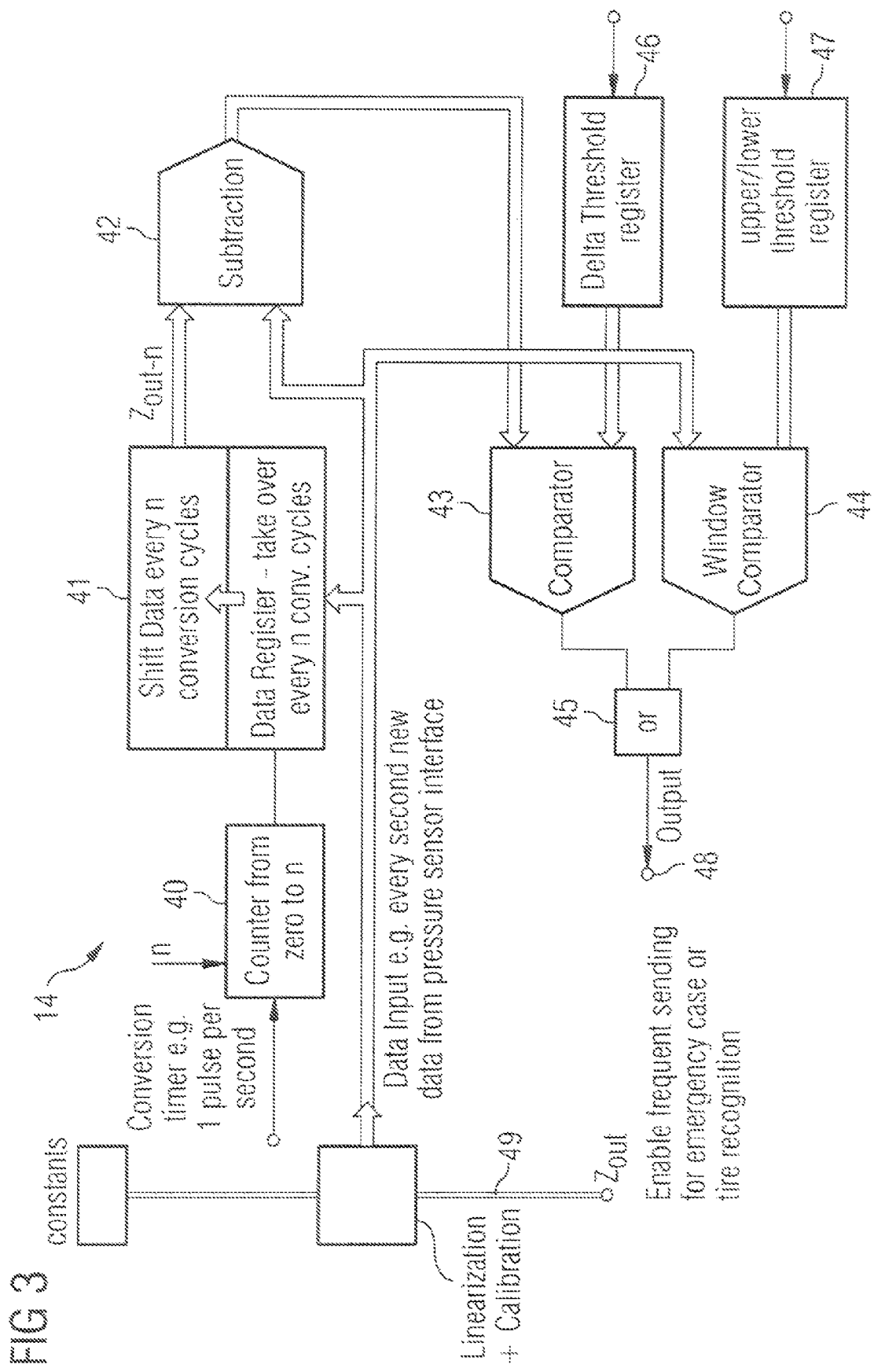
FIG. 3 shows an embodiment of the sensing unit.

FIG. 3 shows an embodiment of the signal processing unit 14. In this embodiment, the unit is adapted to signal a pressure drop as well as a pressure increase by outputting a control signal. The control signal is used to switch the transmitting unit to a higher repetition rate. The linearized and calibrated digital value Zout representing the measured pressure is stored in a data register 41. The value Zout is also forwarded to a first window comparator 44, which compares the value Zout with threshold values stored in a registers 47. If a pressure drop occurs within the tire, the measured value Zout drops below the first threshold value. The result of the comparator 44 is forwarded via the logic OR gate 48 to an output terminal 48. The output signal indicates a pressure drop below a preset limit thereby switching the sensing unit to the higher repetition rate for transmitting data. For pressure values below the second limit of the window comparator, the sensing module is switched back to the low transmission rate. For detecting a fast pressure increase or a fast pressure drop, the measured value Zout is further forwarded to a subtraction unit 42. A second input of the subtraction unit 42 is coupled to a data register 41. The register 41 provides a previous stored pressure measurement value f(Zout-n) for the subtraction 42. The unit 42 subtracts both values and forwards the result to a second comparator 43. The result of unit 42 indicates a pressure variation, allowing detecting pressure increase as well as pressure decrease.

The result is then compared in the comparator 43 with a delta threshold value stored in the delta threshold register 46. If the result from the subtraction unit 42 exceeds the delta threshold value, the output of the comparator indicates a pressure increase or decrease above a predefined delta threshold. The result is forwarded to the output 48 for enabling the higher repetition rate of the transmitting unit.

In this embodiment, different stored values for the subtraction unit 42 can be used. For example, the pressure sensor itself outputs a pressure every second. However, the pressure variation between two subsequent measurements could be very small. Consequently, only each n-th value is stored in the data register in order to get a higher pressure variation as a result. In this embodiment the data register 41 is connected to a counter 40, which outputs the signal clock for the data register every n-th measured pressure value.

Another possibility for getting higher result by the subtraction unit is to store more data value, but shift them by n conversion cycles. For example, if each second a data value is stored and the data is shifted by n=10 cycles, the register 41 output an older value measured 10 seconds before the current measured value.

The value n for the counter 40 can also be used for determining a time period for transmitting data by the sensing unit with the higher repetition rate. If, for example, a sudden pressure drop occurs, the first comparator 44 will output at terminal 48 a signal to indicate a higher repetition rate for the sensing unit. If afterwards the pressure returns to a normal value higher than the value stored in the minimum threshold register 47, the comparator 44 outputs a second signal indicating the lower repetition rate. However, the subtraction unit 42 provides a value still indicating high pressure variation.

Hence, the comparator 43 still outputs a signal setting the sensing unit to a higher repetition rate. The time period for such higher repetition rate is specified by the clock of the conversion timer and the value n for the counter 40. In other words, the counter 40 and the data register 41 is adapted to take over the measured data value every n conversion cycles and shifting the stored data every n conversion cycles. The period for transmitting data with higher repetition rate can be set. The value n can also be dependant of the output signal, thereby switching the value n to a different value in order to set the period for transmitting data with the higher repetition rate.

Figure 4:
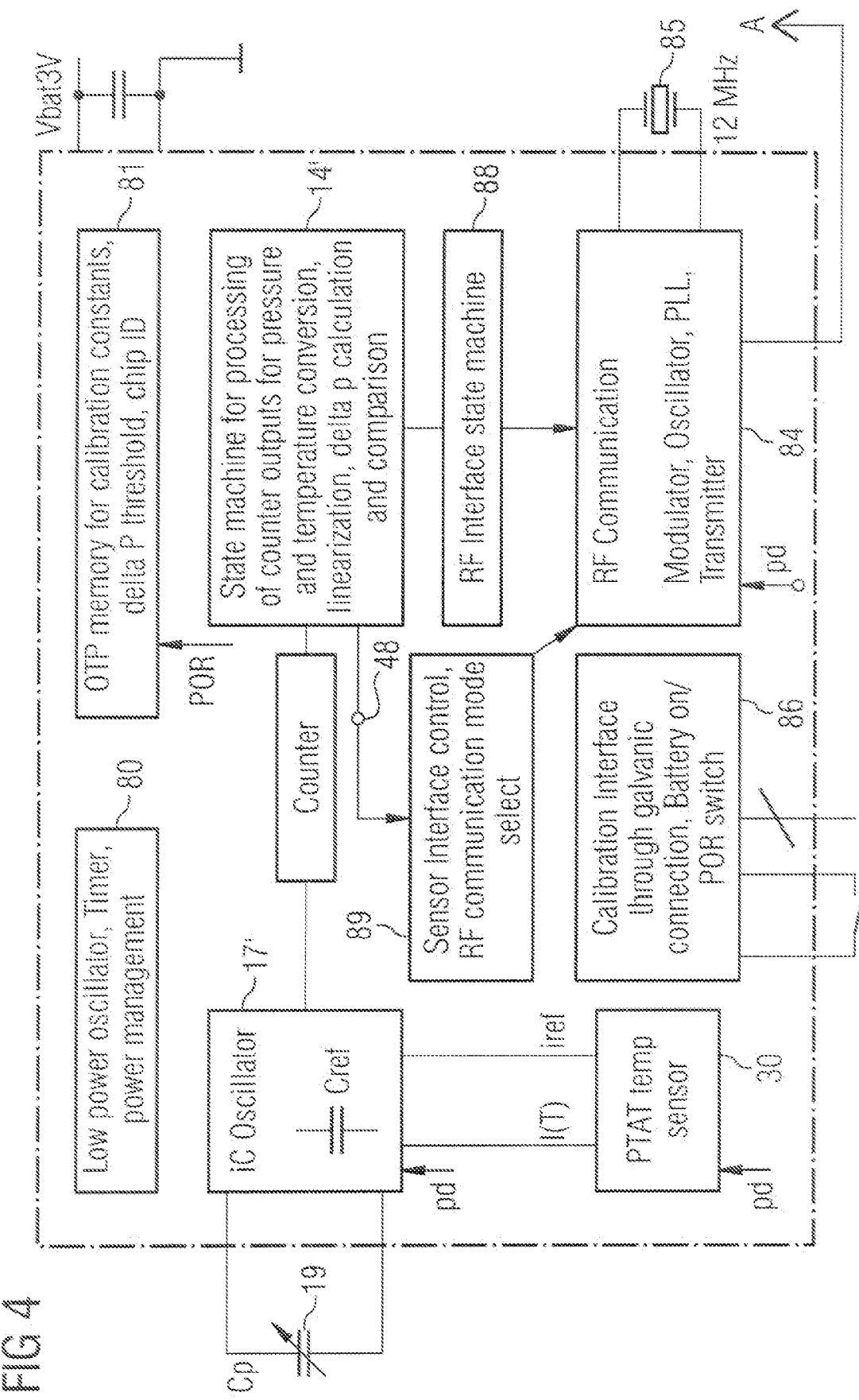
FIG. 4 shows an embodiment of the sensing unit including a transmitter.

FIG. 4 shows an embodiment of the pressure sensing unit including the pressure sensor itself, the signal processing units and the transmitter for transmitting temperature, pressure sensor ID and pressure to a control circuit unit.

The sensing unit comprises a low power oscillator, timer and power management control circuitry 80. The circuitry 80 provides a system clock as well as control circuits for activating and deactivating other circuitry within the sensing unit in order to reduce the overall power consumption. For example, the RF communication unit 84 comprising modulator, oscillator, PLL and transmitter can be switched off completely, if data transmission is not required. In addition, the power management circuitry 80 is used to switch off the oscillator 17 as well the temperature sensor 30 if not required.

The sensing unit further comprises a memory 81 storing calibration constants, the different threshold values as well as a unique pressure sensing unit ID. The delta threshold register 46 as well as the minimum threshold register 47 may be part of the memory 81.

In the pressure sensing unit according to FIG. 4, the oscillator 17', the pressure capacitor 19 as well as the counter are similar to the pressure sensor interface of FIG. 1. The oscillator 17' is further connected to a temperature sensor 30 for compensating a pressure variation derived by a temperature variation. The output of the counter is connected to a state machine 14', which comprises the circuitry of the embodiment according to FIG. 3. The state machine 14' forwards the pressure values or the pressure variation values to an RF interface state machine 88. It is also coupled via the output 48 to a sensor interface control unit 89. Depending on the output signal on terminal 48, the interface control unit 89 switches to the higher repetition rate for a data transmission.

The RF interface state 88 forwards the sensing unit identification, the temperature value, the pressure value, to the RF communication unit 84. In dependence on the selected mode by the sensor interface control 89, the transmitter 84 transmits the forwarded information via the antenna A to a receiver unit not shown herein.

In other words, the repetition rate for data transmission itself is not triggered by an external signal but by the pressure variation itself. If the pressure itself is stable and the pressure variation is very low, the sending rate for data pressure is also set to a low value, e.g. only once per minute. Between transmissions, the RF communication circuitry is switched off reducing the total power consumption.

If the pressure variation is quite high due to a pressure drop or a pressure increase, the sensor interface control 89 selects a higher data sending rate. The sending rate, for example can be set to once per second. The higher sending rate is continued for some time, even if the pressure value itself returns to a stable value and the pressure variation decreases below the threshold value.

Figure 5:
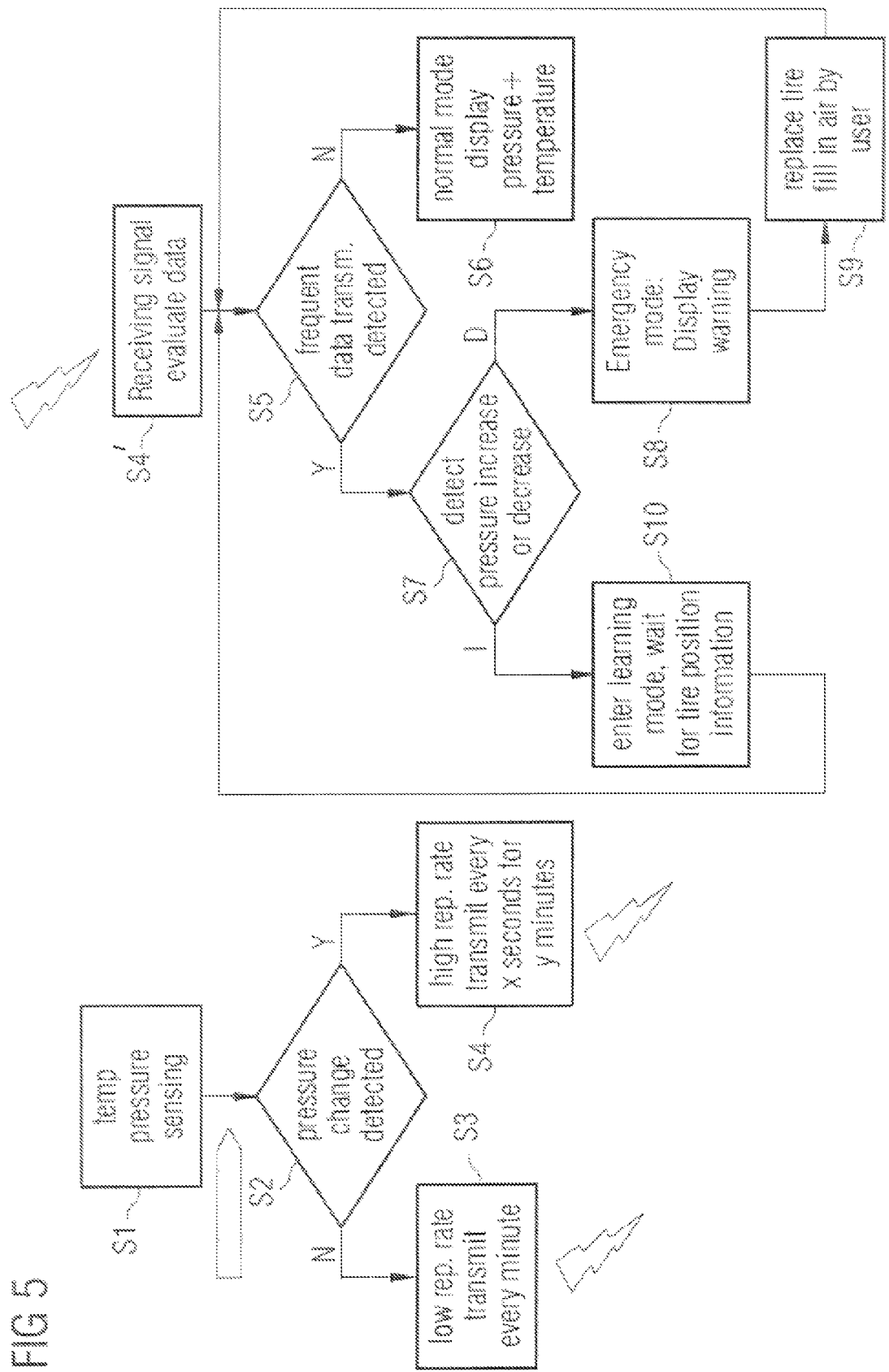
FIG. 5 shows an embodiment of the method to transmit the tire pressure to an evaluation system.

FIG. 5 shows a diagram with the method steps for transmitting pressure measurement data as well as for receiving and evaluating the transmitted data. In step S1 of the transmitting data process, temperature as well as pressure is measured using, for example, the pressure sensor unit according to the embodiment of FIG. 1. The measured values are forwarded for evaluation in the sensing unit.

If in step S2 no pressure change is detected, the pressure as well as other information like temperature, pressure and sensor unit identification is transmitted with a low repetition rate. For example, the pressure is transmitted along with other information every X minute, wherein X is number equal or higher than 1. On the other hand, if in step S2 a pressure a pressure increase or a pressure decrease is detected, the information mentioned above are transmitted with a high repetition rate. For example, the pressure value along with other information is transmitted every second for a number of seconds, for example for one minute. Of course data transmission may be independent from pressure measurement itself Such independency is particular useful in case of the low transmission rate, because the pressure is measured with a different rate than the rate used for data transmission. Sudden pressure drops can therefore be easily detected while still due to the low transmission rate power consumption is reduced.

For receiving transmitted data a receiving unit is provided. A tire pressure measurement system (TPMS) comprising a receiver unit and different sensing units corresponding to the four tires of the vehicles is used. Hence, each of the sensor units transmits a unique identification along with the pressure values in order to allow the receiver to allocate the transmitted pressure to a specific pressure sensing unit thereby determining the pressure of the tire in a specific position.

In step S4', the receiver receives the transmitted signal, demodulates and evaluates the data. This step is performed for each of the pressure sensor units in the tire pressure measurement system. If in step S5, a pressure sensing unit, which transmits data with a high rate of repetition, is not identified and detected respectively, the receiving unit is switched to a normal mode of operation and continues with step S6. In step S6, the pressure values transmitted by every pressure sensing unit is displayed. If, on the other hand, a sensing unit with a high repetition rate of its data is detected, the receiver evaluates in step S7, whether the pressure transmitted by the sensor unit increases or decreases.

In case of a pressure decrease, a pressure drop below the preset limit is assumed. The method continues with step S8 by displaying an emergency warning. The user can now, fill up the tire, replace the tire with a spare tire or take other precaution steps. The method then returns to step S4'.

If, a pressure increase is indicated in step S7 the receiver unit is set to a temporary learning mode in step S10. During the learning mode it waits for tire location information. This temporary mode is of particular interest, if tires are to be replaced.

The receiver unit is designed to differ between a pressure drop emergency event and a tire replacement and the learning mode respectively by evaluating the pressure information transmitted by the sensing unit. If there is a pressure increase instead of a decrease it switches into the temporary mode in step S10. Once the system is in the temporary learning mode it waits for an additional input for determining the position on the vehicle of the corresponding sensing unit. The information of the position can be entered manually, for example through a menu on the car information system. It can also be entered by signaling the location by another method. Such methods could be the use of one of the four blinkers in a scan mode to enter the position or an open/close door actuation.

A further possibility would be to use the position information of the other three tires of the vehicle. For example, one may change only one tire at once and then enters the learning mode. By using the still known position of the other three tires, the receiver unit is capable of determining the position of the new tire. After the position is determined, the values may be stored and the receiver unit switches back to normal operation. The method is then repeated with the other three tires.

Due to the fact that the sensing units may be used as spare parts, the functionality as well as the battery life time should be maintained until the sensing unit is actually installed. For this purpose, the sensing unit is normally switched of during storage and enabled when mounted on a tire. Usually an electromechanical switch is used, which connects the battery to the circuitry. However, the reliability is of concern as the switch could loose its connectivity over a long life time when not used.

Figure 6:
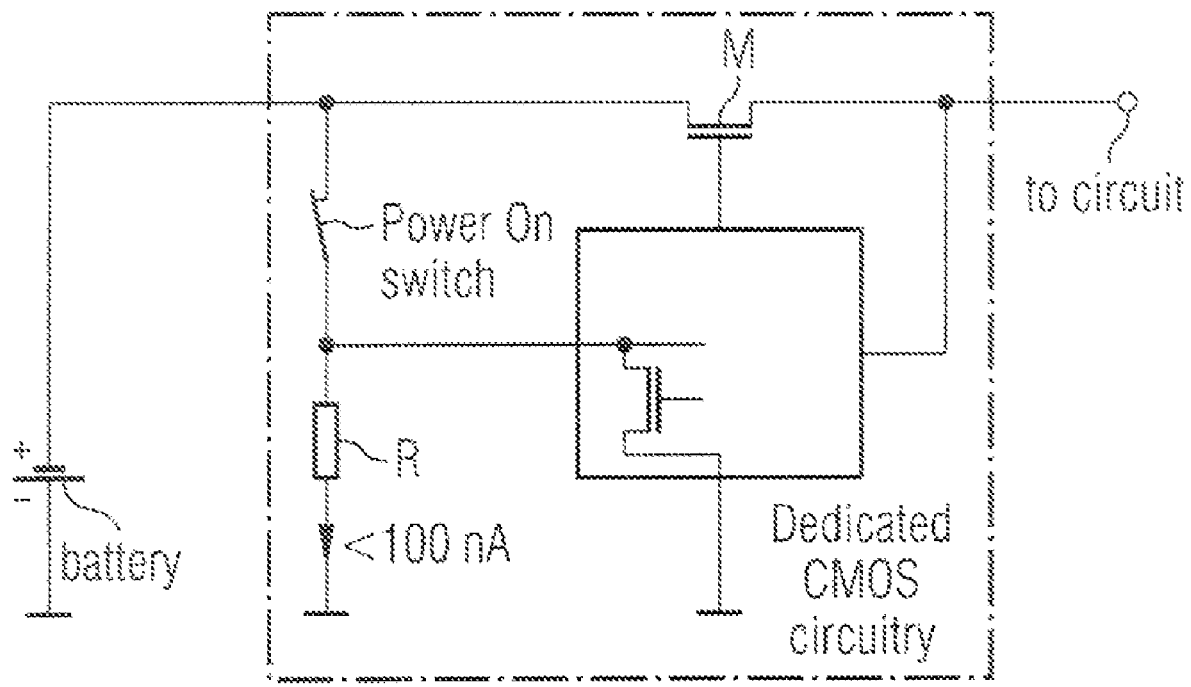
FIG. 6 shows an embodiment of the switch for activating the sensing unit.

FIG. 6 shows an embodiment of a switch providing a better reliability. In this embodiment the "ON"-state is achieved by disconnecting the power on switch between the battery and the resistance R. The battery is connected to the circuitry via a MOS-transistor M acting as the main switch. It further comprises an electromechanical power on switch in the "ON" position as seen to power down the system during storage. In this state, the MOS-transistor M is switched off by a dedicated CMOS circuitry, thereby disconnecting the main sensing unit circuitry from the battery. The CMOS circuitry and the high resistance R result in very low power consumption, much less than the sensing unit in low transmission rate operation.

The power on switch can be a metal line, which is mechanically interrupted, when the module is mounted to the tire. Such interruption is more reliable than a corresponding connection. As the dedicated CMOS circuit has to involve a high resistive path to pull down the switch signal in power "ON" mode, a latch must change the high resistive path of the MOS-transistor M to low resistance. The latch is used to improve reliability and to prevent a switch-off of the sensing unit due for example a leakage caused by high humidity.

In the disclosure a sensor unit, particularly a tire pressure measurement system can be provided without the need of a bidirectional communication. Data are only transmitted from the sensing units on the tires to a receiving unit. Using different repetition rates for transmitting data, different modes of operation can be signaled. The receiving unit can be accordingly switched to different modes of operations. The dynamic data transmission reduces the overall power consumption and increases a battery's lifespan.

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining a tire position in a tire pressure measurement system, comprising:
   receiving data packets comprising pressure measurement data, said data packets transmitted by a pressure sensing unit mounted on a tire;
   evaluating a repetition rate of the received data packets;
   extracting a pressure variation out of the received data packets;
   switching to a first mode of operation if the pressure variation indicates a pressure drop and the repetition rate exceeds a threshold value; and
   switching to a second mode of operation, if the pressure variation indicates a pressure increase and the repetition rate exceeds a threshold value, wherein the second mode of operation comprises:
   waiting for a location information, said information determining the tire position.

2. The method according to claim 1, wherein the received data packets comprise an identification of the pressure sensing unit, the second mode of operation further comprising:
   assigning the identification of the pressure sensing unit to the tire position after the location information has been received; and
   storing the position and the corresponding identification.

3. A pressure sensing unit, comprising:
   a pressure sensing device for providing a first digital signal derived by a pressure;
   a switching device coupled with their input terminal to the pressure sensing device and adapted for providing a selection signal derived by a comparison of a digital value with a first threshold value, the digital value derived by the first digital signal at the input terminal; and
   a transmission device coupled to the switching device and adapted for transmitting a signal comprising data representing a pressure or a pressure variation with a first or a second repetition rate depending on the selection signal,
   wherein the pressure sensing device comprises:
   an oscillator, which is selectively coupled to a reference capacitor or to a pressure capacitor for adjusting a resonance frequency of the oscillator.

4. The pressure sensing unit according to claim 3, wherein the switching device comprise a register for storing a second digital signal at the input terminal and adapted for deriving a pressure variation in dependence of the first and second digital signals.

5. The pressure sensing unit according to claim 4, wherein the switching device comprise a subtraction unit, adapted with a first input to the input terminal and coupled with a second input to an output of the register.

6. The pressure sensing unit according to claim 3, wherein the switching device comprise a counter coupled to the register, the register is configured for storing the second digital signal at the input terminal depending upon an output signal of the counter.

7. The pressure sensing unit according to claim 3, wherein the switching device comprise a counter coupled to the register, the register is configured for outputting the stored second digital signal depending upon an output signal of the counter.

8. The pressure sensing unit according to claim 3, wherein the counter comprises an adjustable counter value.

9. The pressure sensing unit according to claim 3, wherein the switching device comprises:
   a first comparator configured for comparing the first digital signal with at least the first threshold value; and
   a second comparator adapted for comparing a second threshold value with a value representing a pressure variation and derived by the first digital signal.

10. The pressure sensing unit according to claim 3, wherein the pressure sensing device further comprises:
    a first counter coupled to the oscillator for counting clock pulses of the oscillator's output signal.

11. The pressure sensing unit according to claim 10, wherein the pressure sensing device further comprises a second counter comprising a selection input for selecting a count direction, and an input coupled to a system clock for counting clock pulses, wherein the selection input is coupled to an overflow output of the first counter.

12. The pressure sensing unit according to claim 10, wherein the second counter comprises an output coupled to the oscillator for deactivating the oscillator.

13. The pressure sensing unit according to claim 3, further comprising:
    a power control circuit coupled to the transmission device and adapted for deactivating a power supply of the transmission device between two subsequent transmissions.

14. The pressure sensing unit according to claim 3, further comprising:
    a temperature sensor.

* * * * *